UNITED STATES PATENT OFFICE.

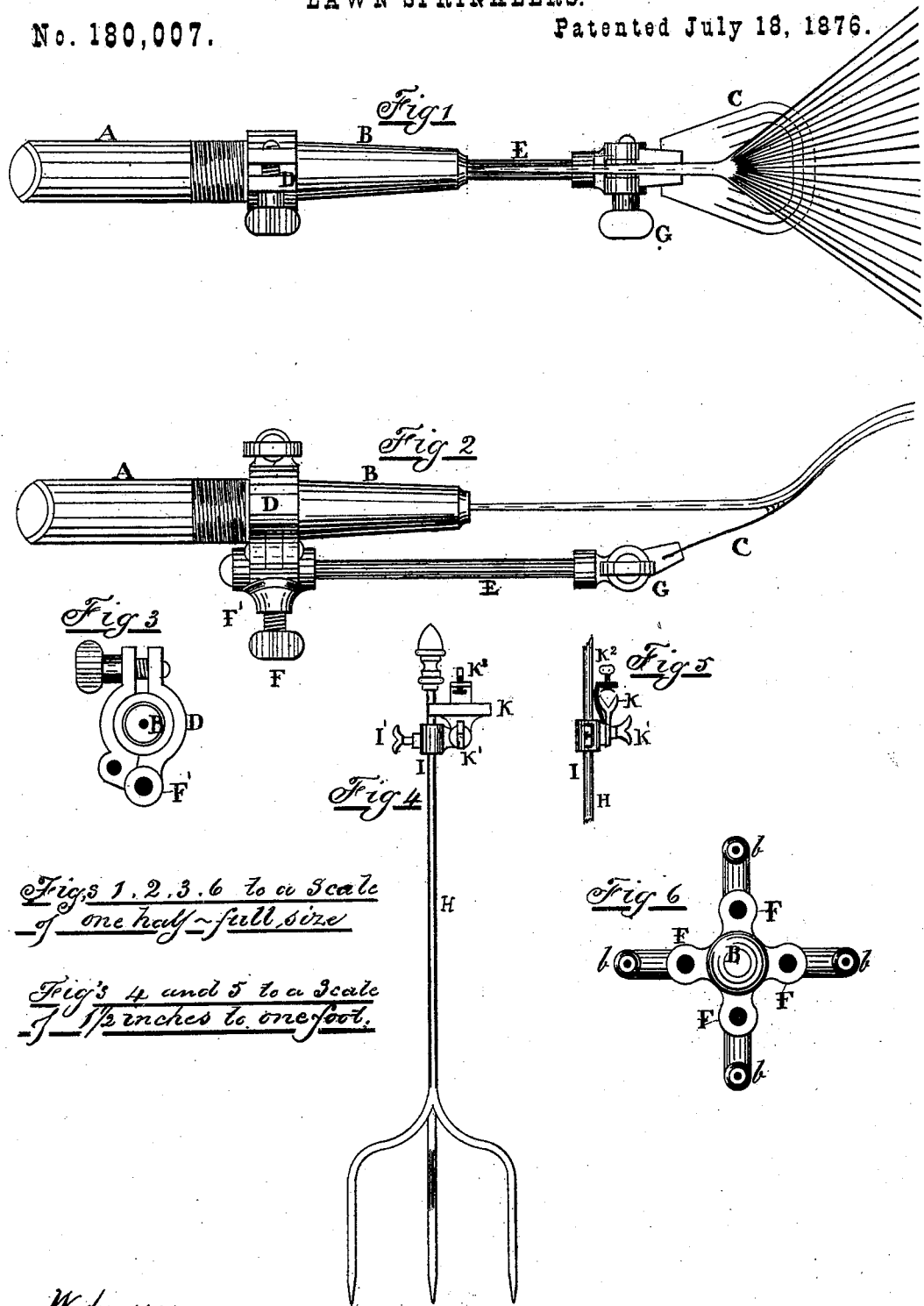

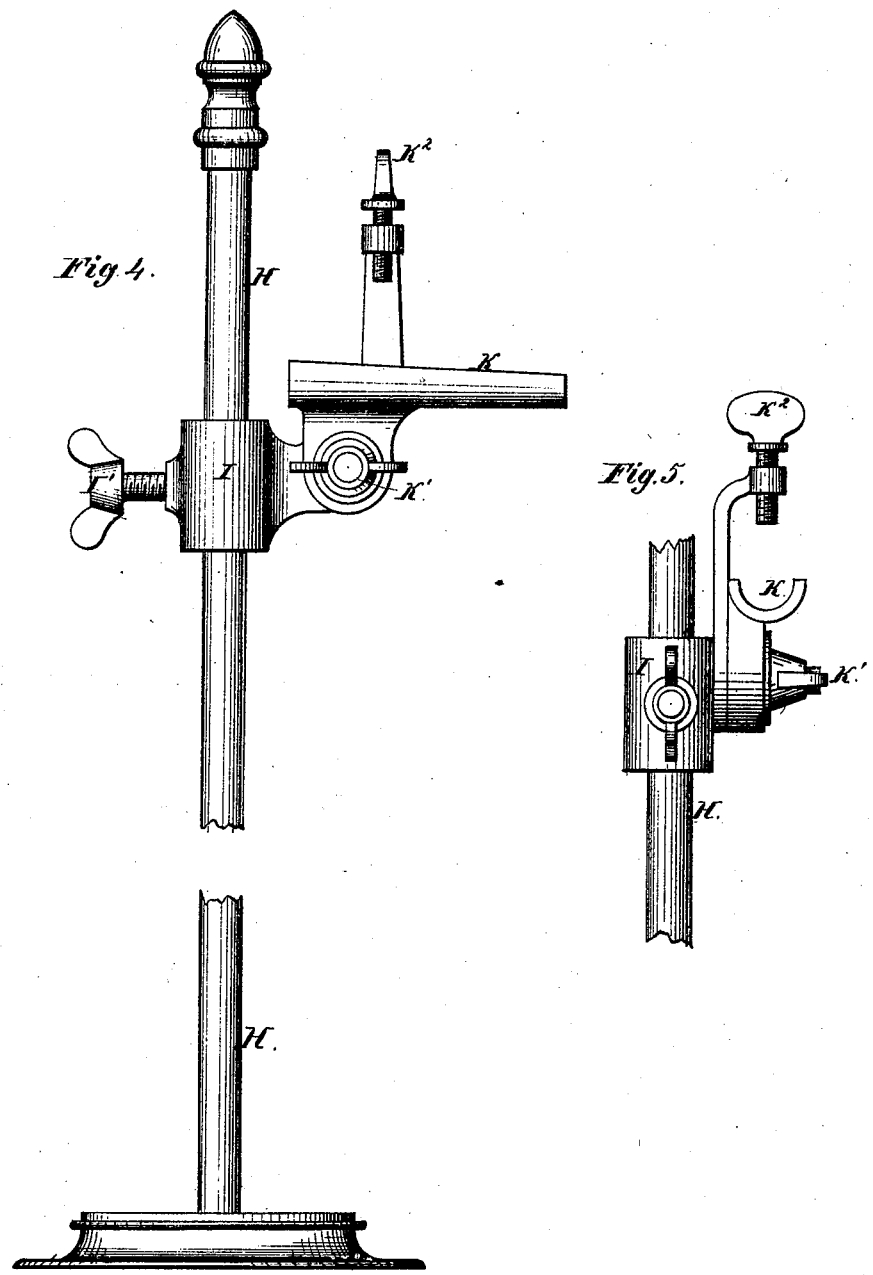

GEORGE H. COPPING, OF TORONTO, ONTARIO, CANADA.

IMPROVEMENT IN LAWN-SPRINKLERS.

Specification forming part of Letters Patent No. 180,007, dated July 18, 1876; application filed March 4, 1876.

*To all whom it may concern:*

Be it known that I, GEORGE HIRAM COPPING, of the city of Toronto, in the county of York, in the Province of Ontario, Canada, machinist, have invented certain new and useful Improvements in Lawn-Sprinklers; and I do hereby declare that the following is a full, clear, and exact description of the same, whereby others skilled in the art might make and use the same, reference being had to the accompanying drawings, and to this specification.

My invention relates to those sprinklers which are attached by means of hose to the supply-pipe, or tap, from the water-works of a community, but can also be used when connected to a pipe supplied with water by means of a force-pump, or any pipe containing water under a sufficient pressure. It consists of a hose and tripod stand, by which the said hose is held up at a height of about three feet from the ground.

The stand is provided with a movable socket, which can be raised or lowered or turned around to any required position. This socket is provided with a snug or projection to which the hose-holder is attached, and allowing the same to be placed at any angle vertically, so as to afford a sufficient range of action to the sprinkler. It consists also of a branch or nozzle, which is attached to the outer end of the hose aforesaid. This branch is furnished with an adjustable concave plate or spray-distributer, by means of which the spray can be distributed in any and every possible direction in which it may be required. Its chief advantages are, first, that its action is perfect; and, second, that, from its simplicity, it can be produced at a cost so as to bring it within the reach of the community at large.

I construct my sprinkler occasionally with a nozzle having several branches, and attach a distributer to each branch, which, when placed in a vertical position, operate as a fountain.

In the accompanying drawings the same letters of reference indicate the same parts in all the views, and in this specification.

Figure 1 is a plan, showing a portion of the hose A, branch B, the concave adjustable spray-distributer C, hinged clamp D, adjustable rod E, and adjusting-screw G.

Fig. 2 is a side view, showing more plainly the various parts enumerated in Fig. 1, and showing also the adjusting-screw F and socket F'.

Fig. 3 is a transverse section, showing the construction of the hinged clamp D, socket F', and adjusting-screw F.

Fig. 4 is an elevation of the tripod stand H, with movable socket I, tightening-screw I', hose-holder K, screw $K^1$, and hose-clamp $K^2$, which keeps the same from moving in the groove of hose-holder K.

Fig. 5 is a view of a portion of the stand H, and showing socket I, hose-holder K, with screw $K^1$ and hose-clamp $K^2$.

Fig. 6 is a plan of nozzle B, with branches $b'$ $b'$ $b'$ $b'$ for more than one distributer C, when so required.

It will be observed on reference to the drawings that if water be admitted under a pressure to the hose A it will rush with a corresponding force through a small aperture in the branch B, and strike at an angle the concave face of the spray-distributer C, and will, in consequence thereof, be scattered and distributed in spray at a considerable distance in front of and on each side of the same, of an equal density, and with precision.

Having thus described my invention, I claim as new, and desire to secure by Letters Patent—

In a lawn-sprinkler, constructed with a spray-distributer, C, as shown and described, the combination therewith of the socket F', rod E, screws F and G, stand H, sliding socket I, hose-holder K, and clamp $K^2$, or its equivalent for carrying hose A, and nozzle B, all as shown and described, and for the purposes set forth.

GEORGE HIRAM COPPING.

Witnesses:
WILLIAM GILL,
JOHN FREDK. THACKRAY.